United States Patent
Nakamura

(10) Patent No.: US 8,896,750 B2
(45) Date of Patent: Nov. 25, 2014

(54) PHOTOGRAPHING DEVICE AND CONTROL METHOD OF ROTATIONAL ANGLE POSITION OF POLARIZED LIGHT FILTER

(71) Applicant: Hoya Corporation, Tokyo (JP)

(72) Inventor: Shin Nakamura, Kanagawa (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/796,358

(22) Filed: Mar. 12, 2013

(65) Prior Publication Data
US 2013/0258173 A1 Oct. 3, 2013

(30) Foreign Application Priority Data

Mar. 30, 2012 (JP) .................................. 2012-078677

(51) Int. Cl.
*H04N 5/225* (2006.01)
(52) U.S. Cl.
CPC .................................. *H04N 5/2254* (2013.01)
USPC ......................................................... 348/360
(58) Field of Classification Search
None
See application file for complete search history.

(56) References Cited

U.S. PATENT DOCUMENTS

| 6,028,303 | A  | * | 2/2000  | Suzuki .......................... 250/225 |
| 6,669,145 | B1 | * | 12/2003 | Green ......................... 244/135 A |
| 7,511,740 | B2 | * | 3/2009  | Shiga et al. ................. 348/229.1 |
| 2006/0291075 | A1 |   | 12/2006 | Nomura |

FOREIGN PATENT DOCUMENTS

JP 2006-208714 8/2006

* cited by examiner

*Primary Examiner* — Luong T Nguyen
(74) *Attorney, Agent, or Firm* — Greenblum & Bernstein, P.L.C.

(57) ABSTRACT

A photographing device includes a photographing optical system having an image sensor, a polarizing filter which rotates about an optical axis of the photographing optical system and is positioned in an optical path thereof, a rotation driver which preliminarily rotates the polarizing filter at a predetermined cycle pattern, a detector which detects an object luminance signal of object-emanating light transmitting through the polarizing filter and captured by the image sensor when the polarizing filter preliminarily rotates the polarizing filter at the predetermined cycle pattern, a signal generator which generates a rotation control signal by eliminating any frequency component of a cycle pattern that is different from the predetermined cycle pattern from the object luminance signal, and a controller which controls a rotational angle position of the polarizing filter based on the rotation control signal generated by the signal generator.

10 Claims, 5 Drawing Sheets

PHOTOGRAPHING DEVICE AND CONTROL METHOD OF ROTATIONAL ANGLE POSITION OF POLARIZED LIGHT FILTER

BACKGROUND OF THE INVENTION

1. Field of the Invention

The present invention relates to a photographing device provided with a polarizing filter that is rotatable about an optical axis of a photographing optical system in an optical path thereof, and also relates to a method of controlling the rotational angle position of such a polarizing filter.

2. Description of the Related Art

According to the related art, there is a photographing device provided with a polarizing filter, and a method of controlling the rotational-angle position of the polarizing filter, in which a rotational angle position of the polarizing filter is controlled on the basis of an object luminance signal. The object luminance signal is captured by preliminary rotation (scanning) of the polarizing filter.

However, the object luminance signal not only includes a pure polarization effect via the polarization filter, the object luminance signal is also affected by disturbance (noise) that is caused by variation of brightness of object image. In particular, if a blinking object (such as traffic signal, turn-signal lamp of vehicle, blinking neon sign, etc.) exists in the object image, such a blinking object considerably increases the adverse influence of problematic disturbance in the object luminance signal, so that a precise control of the rotational-angle position of the polarizing filter cannot be achieved. In other words, such a change in the object luminance signal due to a blinking object is erroneously determined as being caused by the polarization effect of the polarizing filter.

In the related art, a photographing device and a control method thereof is disclosed in Japanese unexamined patent publication 2006-208714.

SUMMARY OF THE INVENTION

The present invention provides a photographing device in which, even if a blinking object exists in an object image, the disturbance effect caused by the blinking object is eliminated, whereby the rotational angle position of polarizing filter can be controlled precisely. The present invention also provides a method of controlling the rotational-angle position of the polarizing filter.

In the related art, the object luminance signal is captured by preliminary rotation of the polarizing filter, and the object luminance signal is straightforwardly used for the rotational angle position control of the polarizing filter.

Whereas, according to the present invention, the object luminance signal is detected while the polarizing filter is driven to preliminarily rotate (inconstant-velocity rotation, constant-velocity rotation, or a combination thereof) at a predetermined cycle pattern. If there is any frequency component of which cycle pattern is different from the predetermined cycle pattern as mentioned above, this type of frequency component is eliminated from the object luminance signal, and thus a rotation control signal is generated. Accordingly, the rotational angle position of the polarizing filter is controlled on the basis of the rotation control signal.

According to an aspect of the present invention, a photographing device is provided, including a photographing optical system provided with an image sensor; a polarizing filter which rotates about an optical axis of the photographing optical system and is positioned in an optical path of the photographing optical system; a rotation driver which preliminarily rotates the polarizing filter at a predetermined cycle pattern; a detector which detects an object luminance signal of object-emanating light transmitting through the polarizing filter and captured by the image sensor when the polarizing filter preliminarily rotates the polarizing filter at the predetermined cycle pattern; a signal generator which generates a rotation control signal by eliminating any frequency component of cycle pattern that is different from the predetermined cycle pattern from the object luminance signal detected by the detector; and a controller which controls a rotational angle position of the polarizing filter based on the rotation control signal generated by the signal generator.

It is desirable for the signal generator to generate the rotation control signal, from the object luminance signal detected by the detector, in which any frequency component having a cycle or phase that differs from that of a luminance signal corresponding to a polarized state when the polarizing filter is rotated preliminarily at the predetermined cycle pattern has been eliminated.

It is desirable for the rotation driver to rotate the polarizing filter at an inconstant velocity. The expression "rotate the polarizing filter at an inconstant velocity" refers to a continual switching between different rotational speeds of the polarizing filter, and also includes the concept of providing a predetermined rotation stopping time (holding time) upon switching the rotational speed of the polarizing filter.

It is desirable for the rotation driver to perform the inconstant-velocity rotation by rotating the polarizing filter by 90 degrees at a first rotational speed, and to thereafter rotating the polarizing filter by a further 90 degrees at a second rotational speed that is double that of the first rotational speed. In this case, the switching between the first rotational speed and the second rotational speed does not necessarily need to be continuously carried out (in a stepless manner), a predetermined rotation stopping time (holding time) can be provided upon switching between the first rotational speed and the second rotational speed.

It is desirable for the rotation driver to rotate the polarizing filter at a constant velocity.

In an embodiment, a method of controlling the rotational-angle position of polarizing filter is provided, wherein the polarizing filter rotates about an optical axis of a photographing optical system, provided with an image sensor, and is positioned in an optical path of the photographing optical system, the method including preliminarily rotating the polarizing filter at a predetermined cycle pattern; detecting an object luminance signal, of object-emanating light which transmits through the polarizing filter and is captured by the image sensor, when the polarizing filter preliminarily rotates at the predetermined cycle pattern; generating a rotation control signal by eliminating any frequency component of a cycle pattern that is different from the predetermined cycle pattern from the object luminance signal; and controlling a rotational angle position of the polarizing filter based on the rotation control signal generated by the signal generator.

It is desirable for the rotation control signal to be generated by eliminating, from the object luminance signal detected by the detector, any frequency component having a cycle or phase that differs from that of a luminance signal corresponding to a polarized state when the polarizing filter is rotated preliminarily at the predetermined cycle pattern.

It is desirable for the polarizing filter to be rotated at an inconstant velocity during the preliminarily rotating of the polarizing filter.

During the preliminarily rotating of the polarizing filter at the inconstant-velocity, it is desirable for the polarizing filter to rotate by 90 degrees at a first rotational speed and to thereafter rotate by a further 90 degrees at a second rotational speed that is double that of the first rotational speed.

It is desirable for the polarizing filter to be rotated at a constant velocity during the preliminary rotating of the polarizing filter.

According to the present invention, even if a blinking object exists in an object image, the disturbance effect caused by the blinking object is eliminated, whereby the rotational angle position of polarizing filter can be controlled precisely. In addition, according to the present invention, the method of controlling the rotational-angle position of the polarizing filter is also provided.

The present disclosure relates to subject matter contained in Japanese Patent Application No. 2012-78677 (filed on Mar. 30, 2012) which is expressly incorporated herein in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
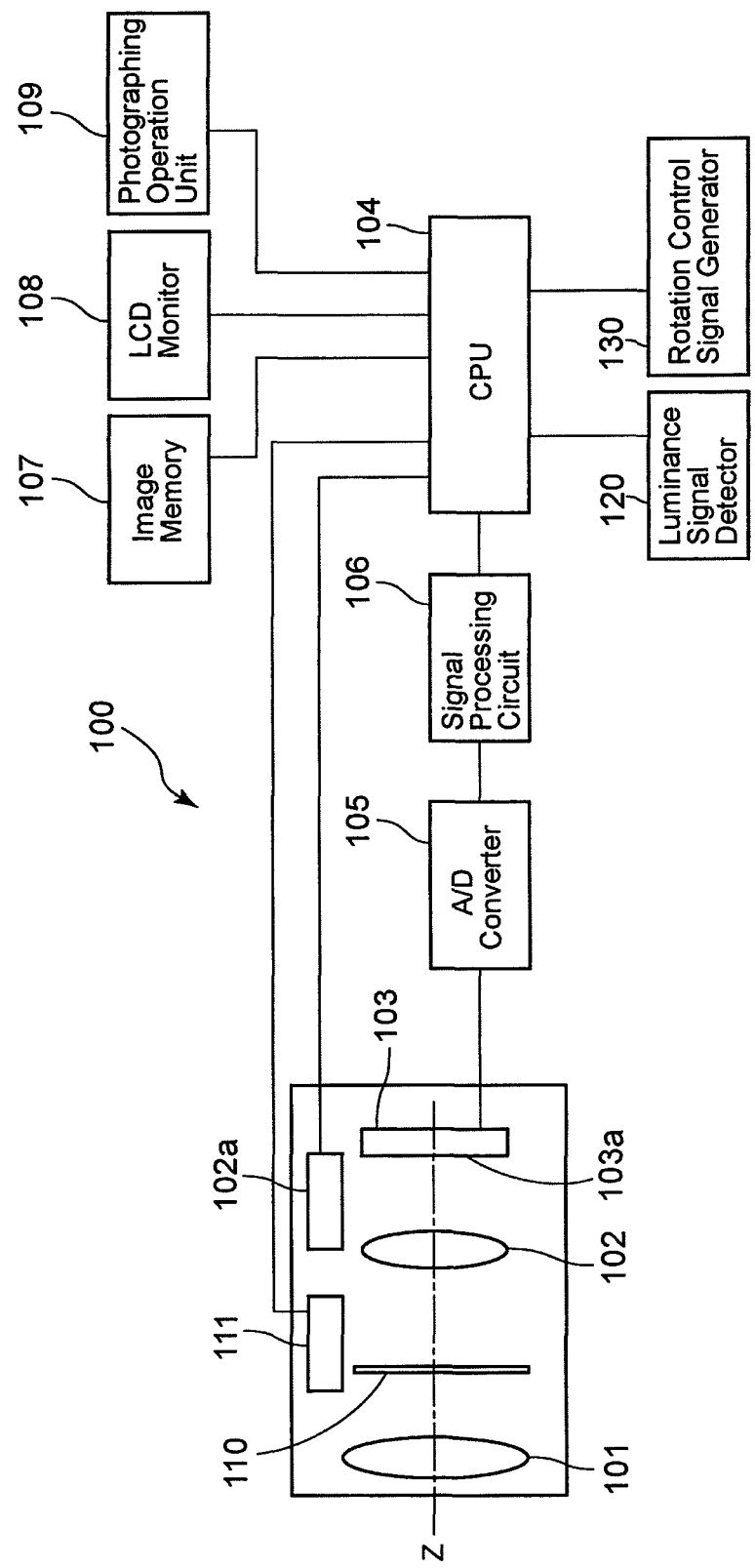
FIG. 1 is a block diagram of a digital camera (photographing device) according to the present invention.

Embodiments of the present invention will be discussed in detail with reference to the drawings attached hereto. FIG. 1 is a block diagram of a digital camera (photographing device) 100, according to the present invention. The digital camera 100 is provided, along a photographing optical axis Z, with a fixed lens group 101, a focusing lens group 102 which is movable along the optical axis Z, and a CCD (image sensor) 103, in that order from the object side. The fixed lens group 101, the focusing lens group 102 and the CCD 103 constitute an imaging optical system. Object-emanated light is incident on, and passes through, the fixed lens group 101 and the focusing lens group 102 to form an object image on an imaging surface 103a of the CCD 103. The focusing lens group 102 is driven by a focusing lens driver 102a (including a focusing motor), and moves in the Z-axis (optical axis) direction during a focusing operation.

The digital camera 100 is provided with a polarizing filter 110 at a position between the fixed lens group 101 and the focusing lens group 102, which are provided in front of the CCD 103. An insertion/removal mechanism (not shown) is provided for inserting the polarizing filter 110 to an inserted position, positioned on the photographing optical axis (photographing optical path) Z, and for removing the polarizing filter 110 to a removed position, positioned away from the photographing optical axis (photographing optical path) Z. The insertion/removal mechanism for the polarizing filter 110 is known to those skilled in the art, an example of which is disclosed in Japanese unexamined patent publication No. 2007-3970.

The polarizing filter 110 is driven by a polarizing filter driver (rotation driver) 111 at the insertion position of the polarizing filter 110, and the polarizing filter 110 is rotatable about the optical axis Z. Although not shown in the drawings, the polarizing filter driver 111 is provided with a stepping motor by which the polarizing filter 110 rotates in a stepwise manner by a predetermined angle. The polarizing filter driver 111 is also provided with a motor driver for controlling rotation of the stepping motor.

The polarizing filter 110 is, e.g., a linear polarizing filter, having a function of only transmitting light that is oscillating in the direction of the polarization itself (the direction of polarization grating). Therefore, when the direction of polarization (the direction of polarization grating) of the polarizing filter 110 is adjusted by rotating the polarizing filter 110 about the photographing optical axis Z, the polarization state of the object-emanated light that is incident in the CCD 103 (upon passing through the fixed lens group 101 and the focusing lens group 102) can be varied, and accordingly, the reflection of object can be reduced, or even eliminated.

The digital camera 100 is provided with a CPU (rotation driver/controller) 104, an A/D converter 105, a signal processing circuit 106, an image memory 107, an LCD monitor 108 and a photographing operation unit 109. The CPU 104 serves for overall functional control of the digital camera 100. The A/D converter 105 performs an A/D conversion (from analogue signal to digital signal) on object images captured by the imaging surface 103a of the CCD 103, and sends the converted digital signal to the signal processing circuit 106. Upon receiving the digital signal from the A/D converter 105, the signal processing circuit 106 carries out a predetermined image processing operation, and generates an image signal. The image signal is recorded in the image memory 107 via the CPU 104, and is displayed on the LCD monitor 108 via the CPU 104. The photographing operation unit 109 includes, for example, a power switch, a zoom operation switch, a shutter release button, a mode dial, etc., for carrying out overall photographing operation.

According to the present embodiment, an auto-mode, constituting a rotation control mode of the polarizing filter 110, is provided, in which the digital camera 100 determines the polarization effect of the polarizing filter 110 and carries out an automatic rotation control of the polarizing filter 110. In the auto-mode, the CPU (rotation driver) 104 performs a preliminary rotation (scanning) of the polarizing filter 110, via the polarizing filter driver (rotation driver) 111, at a predetermined cycle pattern. The time necessary for rotating the polarizing filter 110 by an angle of 180 degrees (half a revolution) is defined as "one cycle."

Figure 2:
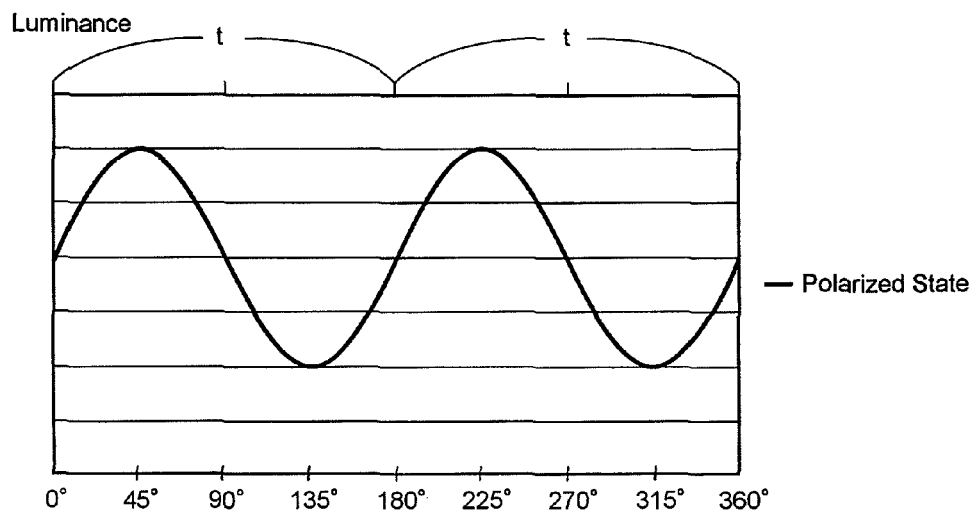
FIG. 2 is a diagram showing an optimum relationship between a rotational angle position of a polarizing filter and an object luminance signal in the case where the object image emanates polarized light, when the polarizing filter is rotated at a constant velocity.

More specifically, as shown in FIG. 2, the CPU 104 controls the polarizing filter 110, which requires time t to rotate by 180 degrees (one cycle), to rotate by 360 degrees (one revolution) for a period "2 t"; namely, the rotation time required for one revolution (360 degrees) of the polarizing filter 110 is 2 t. Accordingly, the CPU 104 controls the polarizing filter 110 to rotate at a constant velocity.

Figure 3:
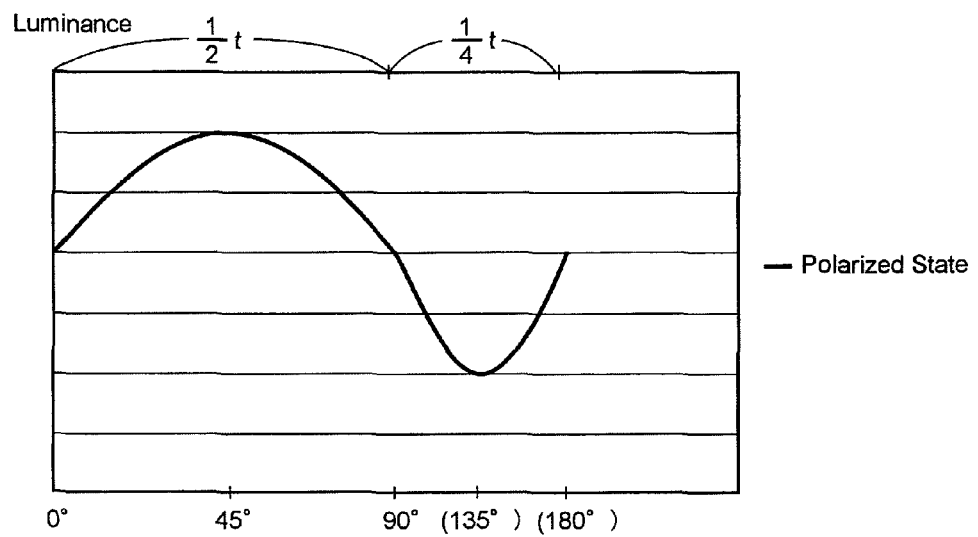
FIG. 3 is a diagram showing an optimum relationship between the rotational angle position of the polarizing filter and the object luminance signal in the case where the object image emanates polarized light, when the polarizing filter is rotated at an inconstant velocity.

FIG. 3 shows another rotation pattern that is performed by the CPU 104. As shown in FIG. 3, the CPU 104 firstly rotates the polarizing filter 110, which requires time t to rotate by 180 degrees (one cycle), by 90 degrees (a quarter revolution; having a required time of ½ t). Thereafter, the rotational speed of the polarizing filter 110 is doubled (cycle: ½ t) so as to require only time ½ t to rotate by 180 degrees (one cycle), and the CPU 104 controls the polarizing filter 110 to further rotate by 90 degrees (quarter revolution; having a required time of ¼ t). Thus, the CPU 104 controls the polarizing filter 110 to rotate at an inconstant velocity. As shown in FIG. 3, since the scale of the rotational angle changes before and after doubling of the rotational speed of the polarizing filter 110, the rotational angle when the polarizing filter 110 rotates for the period "t" is shown without parenthesis, and the rotational angle when the polarizing filter 110 rotates for the period "½ t" is shown with parenthesis.

The digital camera 100 is further provided with a luminance signal detector (detector) 120. The luminance signal detector 120 detects the object luminance signal of the object image obtained by the CCD 103, through the polarizing filter 110, by calculating each pixel of the image signal input from the signal processing circuit 106 to the CPU 104 as the frequency component.

The object luminance signal detected by the luminance signal detector 120 is preferably synchronized with predetermined cycle patterns for preliminarily rotating the polarizing filter 110 (the cycle and phase of the luminance signal corresponding to an optimum polarized state when the polarizing filter 110 is rotated preliminarily by a predetermined cycle pattern), as shown in FIGS. 2 and 3.

Figure 4:
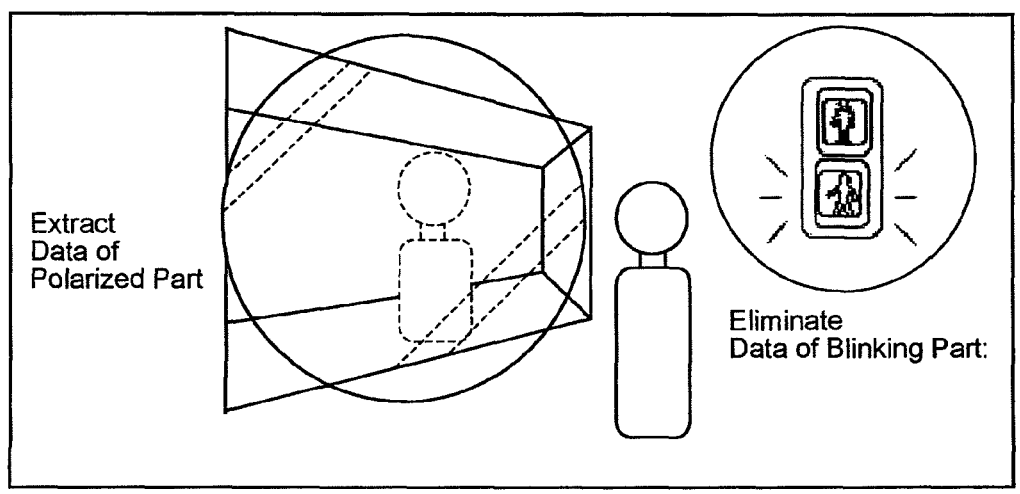
FIG. 4 is a schematic view of a photographing state, in which both a polarized part and a blinking part exist in an object image.

However, as shown in FIG. 4, when a polarized part (a shop window reflecting an image of a person) and a blinking part (a traffic signal) are captured in a single object image, the blinking part would considerably increase the adverse influence of problematic disturbance in the object luminance signal.

Figure 5:
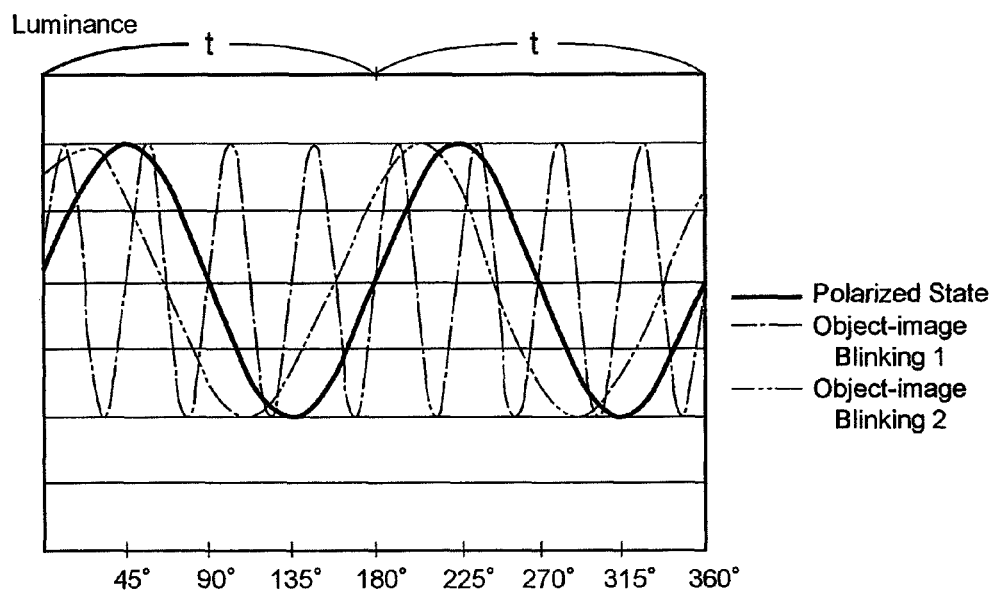
FIG. 5 is a diagram showing a relationship between the rotational angle position of the polarizing filter and the object luminance signal corresponding to FIG. 2, in which both a polarized part and a blinking part exist in an object image.
Figure 6:
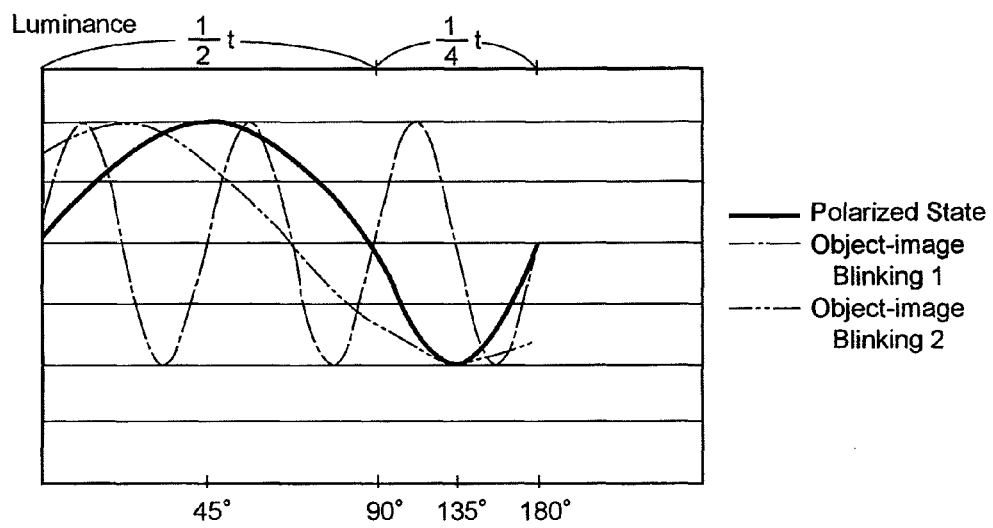
FIG. 6 is a diagram showing a relationship between the rotational angle position of the polarizing filter and the object luminance signal corresponding to FIG. 3, in which both a polarized part and a blinking part exist in an object image.

In other words, as shown in FIGS. 5 and 6, the object luminance signal actually detected by the luminance signal detector 120 in a practical situations includes other frequency components of a cycle pattern, as disturbance (noise), that are different from the frequency component of the predetermined cycle pattern for the preliminary rotation of the polarizing filter 110. Both FIG. 5 and FIG. 6 include a frequency component of "object-image blinking 1", repeatedly blinking at the cycle of "¼ t" (single-dot chain line) which is different from the cycle t of the optimum curve of the polarized state obtained by the polarizing filter 110, and a frequency component of "object-image blinking 2", repeatedly blinking at the same cycle as the cycle t of the optimum curve of the polarized state obtained by the polarizing filter 110 but at a different phase (two-dot chain line). These different frequency components are regarded as "disturbance".

If (unlike the present invention) the CPU 104 were to directly use the object luminance signal detected by the luminance signal detector 120, any change in the object luminance signal caused by blinking of the object image would be mistakenly determined as being due to the polarization effect of the polarizing filter 110. Thus, the rotational angle position of the polarizing filter 110 would not be controlled precisely.

However, in the digital camera 100 of the present invention, when the luminance signal detector 120 detects the object luminance signal, the rotation control signal generator 130 generates a rotation control signal, from the object luminance signal detected by the luminance signal detector 120, in which any frequency component having a cycle or phase that differs from that of the luminance signal corresponding to an optimum polarized state when the polarizing filter 110 is rotated preliminarily at the predetermined cycle pattern (the optimum curves shown in FIGS. 5 and 6) has been eliminated. The rotation control signal generator 130 generates a rotation control signal in which any frequency component of cycle pattern that is different from the predetermined cycle pattern for the making preliminary rotation of the polarizing filter 110 is been eliminated. By utilizing an algorithm such as FFT (Fast Fourier Transform), the rotation control signal generator 130 analyzes the frequency component of object luminance signal detected by the luminance signal detector 120, and extracts only the frequency component that is synchronized with the predetermined cycle pattern for the making preliminary rotation of the polarizing filter 110.

FIG. 5 shows an example of a function of the rotation control signal generator 130. As shown in FIG. 5, the object luminance signal detected by the luminance signal detector 120 includes two frequency components, namely, "object-image blinking 1" (single-dot chain line) and "object-image blinking 2" (two-dot chain line). The cycle of the frequency component of "object-image blinking 1" is different from the cycle of an object luminance signal corresponding to an optimum polarized state when the polarizing filter 110 is rotated preliminarily. On the other hand, although the phase of the frequency component of "object-image blinking 2" is different from the phase of the object luminance signal corresponding to an optimum polarized state when the polarizing filter 110 is rotated preliminarily, the cycle of the frequency component of "object-image blinking 2" coincides with the cycle of the object luminance signal corresponding to an optimum polarized state when the polarizing filter 110 is rotated preliminarily. Therefore, the rotation control signal generator 130 is able to eliminate the frequency component of "object-image blinking 1" completely, but is not able to eliminate the frequency component of "object-image blinking 2" completely. However, since the frequency component of "object-image blinking 1" that repeats high-speed blinking can be eliminated completely, the rotation control signal generator 130 can generate a rotation control signal that is synchronized (not perfectly, but to a certain level) with a predetermined cycle pattern for the making preliminary rotation of the polarizing filter 110.

FIG. 6 shows another example of a function of the rotation control signal generator 130, in which the rotation speed is doubled from the angle of 90 degrees. As shown in FIG. 6, the object luminance signal detected by the luminance signal detector 120 includes two other frequency components, namely, "object-image blinking 1" (single-dot chain line) and "object-image blinking 2" (two-dot chain line). The cycle of the frequency component of "object-image blinking 1" is different, both before and after doubling the rotational speed, from the cycle of an object luminance signal corresponding to an optimum polarized state when the polarizing filter 110 is rotated preliminarily. On the other hand, the cycle of the frequency component of "object-image blinking 2" become different, after doubling the rotational speed, from the cycle of an object luminance signal corresponding to an optimum polarized state when the polarizing filter 110 is rotated preliminarily. Accordingly, the rotation control signal generator 130 can completely eliminate the frequency component of both the "object-image blinking 1" and the "object-image blinking 2". Accordingly, by completely eliminating the frequency components of both the "object-image blinking 1" and the "object-image blinking 2", the optimum rotation control signal (as shown in FIG. 3) that is completely synchronized with a predetermined cycle pattern for the making preliminary rotation of the polarizing filter 110 can be generated.

The majority of blinking objects (for example, traffic signals, turn-signal lamps of vehicles, blinking neon signs, etc.) blink/intermit repeatedly at a constant cycle (but at differing intermission speeds). Therefore, as illustrated in FIG. 2 and FIG. 5, when the polarizing filter 110 is rotated at a constant velocity, there would be a case in which, a cycle pattern of a blinking part in an object image coincides, by chance (unexpectedly), with a predetermined cycle pattern for the making preliminary rotation of the polarizing filter 110. On the other hand, as shown in FIG. 3 and FIG. 6, when the polarizing filter 110 is rotated at an inconstant velocity, there is almost no possibility that a cycle pattern of any blinking part in an object image follows or coincides with a predetermined cycle pattern for the preliminary rotation of the polarizing filter 110. Therefore, the frequency component of such a blinking part can be eliminated completely regardless of whether any blinking part exists in an object image, and accordingly, an optimum photographic image can be obtained.

The CPU 104 controls the rotational angle position of the polarizing filter 104 based on the rotation control signal generated by the rotation signal generator 130. For example, the object luminance signals in FIG. 2 and FIG. 3 show the luminance state of a water surface, and if it is desired for the reflection on the water surface to be eliminated, the CPU 104 controls the polarizing filter 110 to rotate to the rotational angle position of 135 degrees, at which the object luminance signal output becomes the smallest value.

Figure 7:
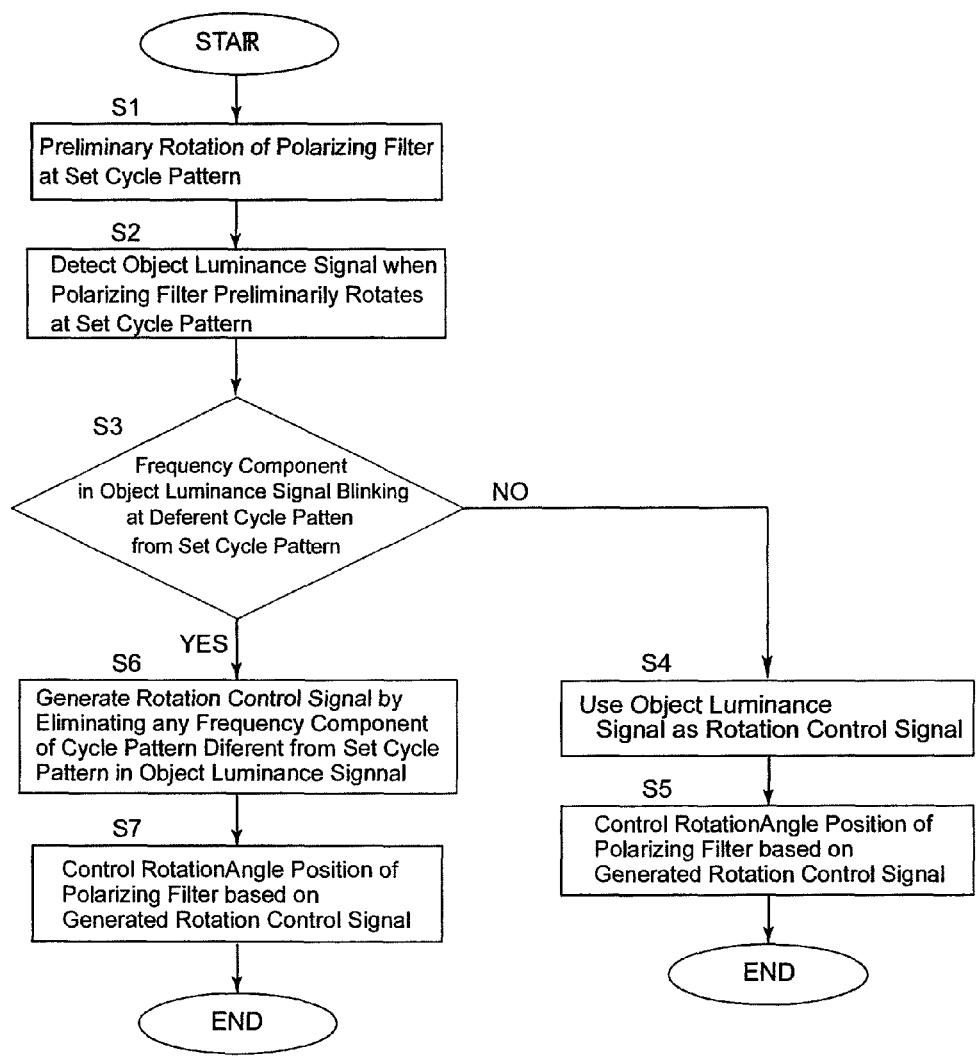
FIG. 7 is a flow chart showing a method of controlling the rotational-angle position of the polarizing filter according to the present invention.

A method of controlling the rotational-angle position of the polarizing filter 110 according to the present invention will now be discussed, with reference to the flowchart of FIG. 7.

The CPU 104 controls the polarizing filter 104 to preliminarily rotate at a predetermined cycle pattern (inconstant-velocity rotation, constant-velocity rotation, or a combination thereof) via the polarizing filter driver 111 (step S1).

When the polarizing filter 110 preliminarily rotates at the predetermined cycle pattern, the luminance signal detector 120 detects an object luminance signal of object-emanating light which has transmitted through the polarizing filter 110 and has been captured by the CCD 103 (step S2).

The CPU 104 determines whether or not there is a frequency component that is blinking at a cycle pattern different from the predetermined cycle pattern for the preliminary rotation of the polarizing filter 110 (the cycle pattern of an object luminance signal corresponding to an optimum polarized state when the polarizing filter 110 is rotated preliminarily), in the object luminance signal detected by the luminance signal detector 120 (step S3).

If CPU 104 determines that there is no frequency component blinking at a cycle pattern different from the predetermined cycle pattern for making preliminary rotation of the polarizing filter 110 (the cycle pattern of an object luminance signal corresponding to an optimum polarized state when the polarizing filter 110 is rotated preliminarily) in the object luminance signal detected by the luminance signal detector 120 (step S3: NO), then the CPU 104 determines that the object luminance signal detected by the luminance signal detector 120 is to be used directly as the rotation control signal (step S4). Hence, the CPU 104 controls the rotational angle position of the polarizing filter 110 based on the object luminance signal (step S5).

On the other hand, if CPU 104 determines that there is a frequency component which is blinking at a cycle pattern different from the predetermined cycle pattern for making preliminary rotation of the polarizing filter 110 (the cycle pattern of an object luminance signal corresponding to an optimum polarized state when the polarizing filter 110 is rotated preliminarily) in the object luminance signal detected by the luminance signal detector 120 (step S3: YES), then the CPU 104 commands the rotation signal generator 130 to generate a rotation control signal in which any frequency component blinking at a cycle pattern different from the predetermined cycle pattern for making preliminary rotation of the polarizing filter 110 (the cycle pattern of an object luminance signal corresponding to an optimum polarized state when the polarizing filter 110 is rotated preliminarily) is eliminated from the object luminance signal detected by the luminance signal detector 120 (step S6). Thus the CPU 104 controls the rotational angle position of the polarizing filter 110 based on the rotation control signal generated by the rotation signal generator 130 (step S7).

According to the above-described present embodiment, when the polarizing filter 110 is rotated at an inconstant velocity, although the polarizing filter 110 firstly rotates by 90 degrees at the cycle "t", and thereafter, the polarizing filter 110 rotates by a further 90 degrees at the cycle "½ t" (double the speed), this is an example of inconstant-velocity rotation of the polarizing filter 110; the present invention is not limited to this embodiment. For example, the rotation speed of the polarizing filter 110 may be varied at three-stages or more.

Furthermore, according to the present embodiment as discussed above, the disturbance effect chiefly caused by a blinking part of an object image is eliminated so as to provide optimum photographic images. However, the present invention can also be applied to eliminate other disturbances such as a disturbance caused by image-shake correction (image stabilizing). In a typical AF system of the related art, when a predetermined area of an object image is fixed as a signal acquisition area, disturbance (noise) in the object luminance signal caused by image-shake (in which the object image as a light source enters and exits the signal acquisition area) may occur. Whereas, according to the present invention, any disturbance effect caused by image-shaking is eliminated, whereby an optimum photographic image can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A photographing device comprising:
   a photographing optical system provided with an image sensor;
   a polarizing filter that rotates about an optical axis of said photographing optical system and is positioned in an optical path of said photographing optical system;
   a rotation driver that preliminarily rotates said polarizing filter at a predetermined cycle pattern;
   a detector that detects an object luminance signal of object-emanating light transmitting through said polarizing filter and captured by said image sensor when said rotation driver preliminarily rotates said polarizing filter at said predetermined cycle pattern;
   a signal generator that generates a rotation control signal by eliminating any frequency component of cycle pattern that is different from said predetermined cycle pattern from said object luminance signal detected by said detector; and
   a controller that controls a rotational angle position of said polarizing filter based on said rotation control signal generated by said signal generator, wherein said signal generator generates said rotation control signal, from said object luminance signal detected by said detector, in which any frequency component having a cycle or phase that differs from a cycle or phase of a luminance signal corresponding to a polarized state when said polarizing filter is rotated preliminarily at said predetermined cycle pattern has been eliminated.

2. The photographing device according to claim 1, wherein said rotation driver rotates said polarizing filter at an inconstant velocity.

3. The photographing device according to claim 2, wherein said rotation driver rotates said polarizing filter at said inconstant velocity by rotating said polarizing filter by 90 degrees at a first rotational speed, and thereafter rotating said polarizing filter by a further 90 degrees at a second rotational speed that is a double that speed of said first rotational speed.

4. The photographing device according to claim 1, wherein said rotation driver rotates said polarizing filter at a constant velocity.

5. A method of controlling a rotational-angle position of a polarizing filter, wherein the polarizing filter rotates about an optical axis of a photographing optical system, provided with an image sensor, and is positioned in an optical path of the photographing optical system, the method comprising:
　preliminarily rotating the polarizing filter at a predetermined cycle pattern;
　detecting an object luminance signal, of object-emanating light which transmits through the polarizing filter and is captured by the image sensor, when the polarizing filter preliminarily rotates at the predetermined cycle pattern;
　generating a rotation control signal by eliminating any frequency component of a cycle pattern that is different from the predetermined cycle pattern from the detected object luminance signal; and
　controlling a rotational angle position of the polarizing filter based on the generated rotation control signal,
　wherein the rotation control signal is generated by eliminating, from the detected object luminance signal, any frequency component having a cycle or phase that differs from a cycle or phase of a luminance signal corresponding to a polarized state when the polarizing filter is rotated preliminarily at the predetermined cycle pattern.

6. The method of controlling the rotational-angle position of polarizing filter according to claim 5, wherein the polarizing filter is rotated at an inconstant velocity during the preliminarily rotating of the polarizing filter.

7. The method of controlling the rotational-angle position of polarizing filter according to claim 6, wherein, during the preliminarily rotating of the polarizing filter at the inconstant velocity, the polarizing filter rotates by 90 degrees at a first rotational speed and thereafter rotates by a further 90 degrees at a second rotational speed that is a double speed of the first rotational speed.

8. The method of controlling the rotational-angle position of polarizing filter according to claim 5, wherein the polarizing filter is rotated at a constant velocity during the preliminary rotating of the polarizing filter.

9. A photographing device comprising:
　a photographing optical system provided with an image sensor;
　a polarizing filter that rotates about an optical axis of said photographing optical system and is positioned in an optical path of said photographing optical system;
　a rotation driver that preliminarily rotates said polarizing filter at a predetermined cycle pattern;
　a detector that detects an object luminance signal of object-emanating light transmitting through said polarizing filter and captured by said image sensor when said rotation driver preliminarily rotates said polarizing filter at said predetermined cycle pattern;
　a signal generator that generates a rotation control signal by eliminating any frequency component of cycle pattern that is different from said predetermined cycle pattern from said object luminance signal detected by said detector; and
　a controller that controls a rotational angle position of said polarizing filter based on said rotation control signal generated by said signal generator,
　wherein said rotation driver rotates said polarizing filter at an inconstant velocity, and
　wherein said rotation driver rotates said polarizing filter at said inconstant velocity by rotating said polarizing filter by 90 degrees at a first rotational speed, and thereafter rotating said polarizing filter by a further 90 degrees at a second rotational speed that is a double speed of said first rotational speed.

10. A method of controlling a rotational-angle position of a polarizing filter, wherein the polarizing filter rotates about an optical axis of a photographing optical system, provided with an image sensor, and is positioned in an optical path of the photographing optical system, the method comprising:
　preliminarily rotating the polarizing filter at a predetermined cycle pattern;
　detecting an object luminance signal, of object-emanating light which transmits through the polarizing filter and is captured by the image sensor, when the polarizing filter preliminarily rotates at the predetermined cycle pattern;
　generating a rotation control signal by eliminating any frequency component of a cycle pattern that is different from the predetermined cycle pattern from the object luminance signal; and
　controlling a rotational angle position of the polarizing filter based on the generated rotation control signal,
　wherein the polarizing filter is rotated at an inconstant velocity during the preliminarily rotating of the polarizing filter, and
　wherein, during the preliminarily rotating of the polarizing filter at the inconstant velocity, the polarizing filter rotates by 90 degrees at a first rotational speed and thereafter rotates by a further 90 degrees at a second rotational speed that is a double speed of the first rotational speed.

* * * * *